(No Model.)
G. W. SCHROEDER.
STOCK PUMP.
No. 404,737. Patented June 4, 1889.
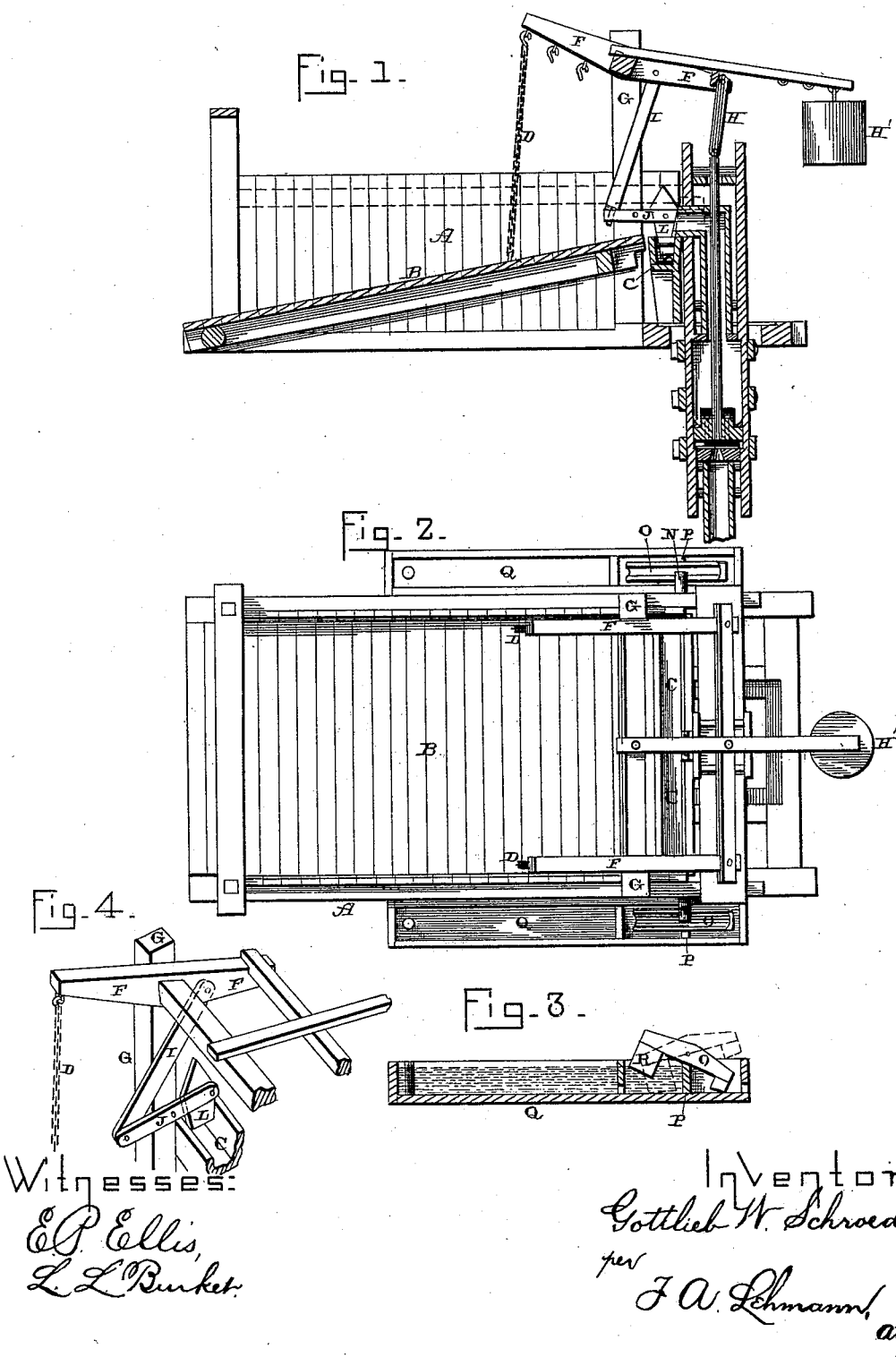

UNITED STATES PATENT OFFICE.

GOTTLIEB W. SCHROEDER, OF HUNTINGTON, INDIANA.

STOCK-PUMP.

SPECIFICATION forming part of Letters Patent No. 404,737, dated June 4, 1889.

Application filed February 14, 1889. Serial No. 299,841. (No model.)

*To all whom it may concern:*

Be it known that I, GOTTLIEB W. SCHROEDER, of Huntington, in the county of Huntington and State of Indiana, have invented certain new and useful Improvements in Stock-Pumps; and I do hereby declare the following to be a full, clear, and exact description of the invention, such as will enable others skilled in the art to which it pertains to make and use it, reference being had to the accompanying drawings, which form part of this specification.

My invention relates to an improvement in stock-pumps; and it consists in, first, the combination of a pivoted platform, which is operated by the weight of the animals, connecting rods or chains, and a weighted frame pivoted between two uprights and to which the pump-piston and piston-rod are connected, with a valve for letting off the old water from the trough after the animal is through drinking; second, the combination of the main trough, into which the water is pumped by the weight of the animal, and a second trough placed at a lower level, and a guide pivoted upon a partition, and which is adapted to be operated at one end by the water, so as to change the direction of the water after the trough is full, as will be more fully described hereinafter.

The object of my invention is to provide a stock-pump in which the weight of the animal is made to pump the water, and which is provided with a valve for allowing the water to run off after the animal is done drinking, and a pivoted guide for changing the direction of the water that is running out of the upper trough after the lower trough has been filled.

Figure 1 represents a vertical section of a pump which embodies my invention. Fig. 2 is a plan view of the same. Fig. 3 is a detached view of the lower trough. Fig. 4 is a detailed view showing the valve mechanism.

A represents a suitable frame-work of any desired shape or construction which may be preferred, and in which the pivoted platform B is placed. The inner end of this platform B approaches close to the trough C, in which the water is pumped for the use of the animals, and to the inner end of this platform are attached the chains, rods, or wires D, by means of which the inner end of the platform is connected to the frame F, which is pivoted between the two standards G, which form a part of the frame A. The inner end of this frame F is provided with a series of hooks, so as to change the point at which the chains, rods, or wires D can be attached to the frame F, and thus adapt the platform to be operated by either heavy or light animals, as may be preferred. The farther the chains or rods are attached from the center of motion the less the weight of the animal required to operate the platform.

Connected to the frame F are the piston-rod and piston which raise the water through the pump into the trough C when the platform is depressed. The piston snugly fits the inside of the cylinder, and is provided with a series of openings through it and a suitable valve upon its top. When the piston is forced downward by the rod H, attached to the frame F, the water passes through the opening in the piston and rises into the cylinder. When the animal depresses the platform and raises the piston, this water is forced into the trough. As soon as the animal leaves the platform the weight H' instantly raises it into position again.

Extending down from the under side of the frame F is an operating-rod I, the lower end of which passes through one end of the weighted lever J, to which the valve L is loosely connected. When the platform descends, the rod I is raised, and then the weighted end of the lever J allows the valve L to descend and close the opening through which the old water runs from the trough as soon as the animal leaves the platform. When the animal walks upon the platform, the rod I is raised, and the weighted end of the lever J causes the valve L to close the opening, so that no water can escape from the trough while the animal is drinking.

All the water which runs from the trough C passes through the pipe N and runs upon the pivoted guide O, which is placed upon the top of a partition P on one end of the trough Q. This trough Q is placed at right angles thereto and from which the smaller animals are intended to drink. The pivoted guide O is inclined from one end to the other, and when in this normal position its inner end is inclined toward the longer end of the trough Q, so as to keep the trough constantly filled with water. For the purpose of keeping this guide O inclined, as shown in solid lines, a block or float R of any kind is attached to its end, and which float is sufficiently heavy to keep the guide in the desired position. As soon as the trough becomes filled with water to a certain height, the water raises the float, so as to incline its outer end downward, in which case the water running through the pipe N from the trough C passes upon the other side of the partition P, from whence it runs either upon the ground or can be conducted back into the well, as may be desired.

By means of the construction here shown and described the larger animals are made to pump water not only for themselves, but the smaller ones.

Having thus described my invention, I claim—

1. In a stock-pump, the combination of the pivoted platform, the uprights G, the frame F, the weight H, connected to the frame, the chains D, for connecting the frame to the platform, the connecting-rod I, the pivoted lever J, operated by the rod I, the valve L, pivoted to the lever, and the trough C, having an opening through one end, substantially as shown.

2. The combination of the trough C, the platform, the pump, and the pivoted frame placed above the pump and connected both to it and the platform, with the trough Q, placed at the end of the one C, so as to receive water therefrom, the partition P, placed in one end of the trough, and the pivoted guide O, placed above the partition and having a float R secured to its inner end, substantially as described.

In testimony whereof I affix my signature in presence of two witnesses.

GOTTLIEB W. SCHROEDER.

Witnesses:
E. P. ELLIS,
F. A. LEHMANN.